Aug. 11, 1936.  F. H. BENGE ET AL  2,050,916
FIBER SPOKE GEAR
Filed Feb. 8, 1933   2 Sheets-Sheet 1

Inventors
Frank H. Benge
John Petro
by their Attorneys
Howson & Howson

Aug. 11, 1936.   F. H. BENGE ET AL   2,050,916
FIBER SPOKE GEAR
Filed Feb. 8, 1933   2 Sheets-Sheet 2

Inventors:
Frank H. Benge
John Petro
by their Attorneys
Howson & Howson

Patented Aug. 11, 1936

2,050,916

UNITED STATES PATENT OFFICE 2,050,916

FIBER SPOKE GEAR

Frank H. Benge, Norristown, and John Petho, Spring Mount, Pa., assignors to Continental-Diamond Fibre Company, Newark, Del., a corporation of Delaware Application February 8, 1933, Serial No. 655,814

4 Claims. (Cl. 74—445)

The present invention relates to fiber or fabric gears, known as composite gears, and particularly to resin-impregnated fiber or fabric gears. The general purpose of the invention is to provide a gear of this type of novel construction and having highly improved operating characteristics. This application is a continuation in part of co-pending application Serial No. 491,292, filed October 25, 1930.

It is also a general object of the invention to provide a fiber or fabric gear of a simple construction which eliminates certain objectionable features normally inherent in prior art devices of this class.

A more specific object of the invention is to provide an improved fiber or fabric gear having a discontinuous or spoke web whereby vibration of the web, which has heretofore caused objectionable noise during operation of the gear, is substantially eliminated.

Fiber or fabric gears are well known and have heretofore been manufactured with a solid fiber web. Because of the characteristic resiliency of the material from which the gear is made, the web acts as a diaphragm and amplifies all gear noises created when gears of this type are in operation; that is, the vibrations of the operating gear are transferred to the web which is thus set into vibration acting as a sound reproducing diaphragm. As is well known, materials in general have a natural vibration frequency, and this is also true of the web of these gears when in operation. When the speed and, therefore, the number of teeth in contact per second are such as to correspond with the natural vibration frequency of the web, the latter will be set into vibration at that frequency and sounds of increased volume will be reproduced.

A fiber spoke gear is described and claimed in Letters Patent No. 1,778,789, issued to Leroy Benge October 21, 1930. The present invention relates to an improvement in the construction of that type of gear and to an improved method of making such a gear.

The above objects and features of our invention, as well as the details of construction and the methods of making the same, may be more clearly understood from the following detailed description taken in connection with the accompanying drawings.

The gear of the present invention comprises a preformed wheel portion, composed of small pieces of fibrous material joined together by a binder, and a rim portion, composed of fibrous laminations and a binder. The rim portion surrounds the wheel portion and is bonded thereto to form a unitary structure. Preferably the binder employed in both the wheel portion and the rim portion is a synthetic resin, for example a phenolic resin. The wheel portion composed of the small resin-impregnated fibrous material is preformed in the form of a spoke wheel comprising a hub, spokes, and a rim or annulus surrounding the spokes. The diameter of this wheel portion bears such a relationship to the inside diameter of the main rim portion of the gear that it fits snugly within said rim portion. The scrap material resulting from the manufacture of the rim may be advantageously employed in preforming the wheel portion since this scrap, which would otherwise be wasted, is utilized, thus effecting a saving in the cost of the gear. The rim is composed of resin-impregnated fabric laminations and may be preformed or assembled in a mold in which the preformed wheel portion is placed. Laminations are employed in the rim since, as is well known, such a structure has greater mechanical strength than a structure formed of impregnated mass material. Any suitable laminations may be used, ringlike laminations or segments lying parallel to the general plane of the gear and normal to its axis being preferred. However, the rim may be built up of small square or rectangular sheets or laminations placed perpendicularly to the general plane of the gear and arranged in ringlike fashion. A gear rim of this type and the method of making it are described in copending application Serial No. 643,519, filed November 19, 1932.

Figure 4:
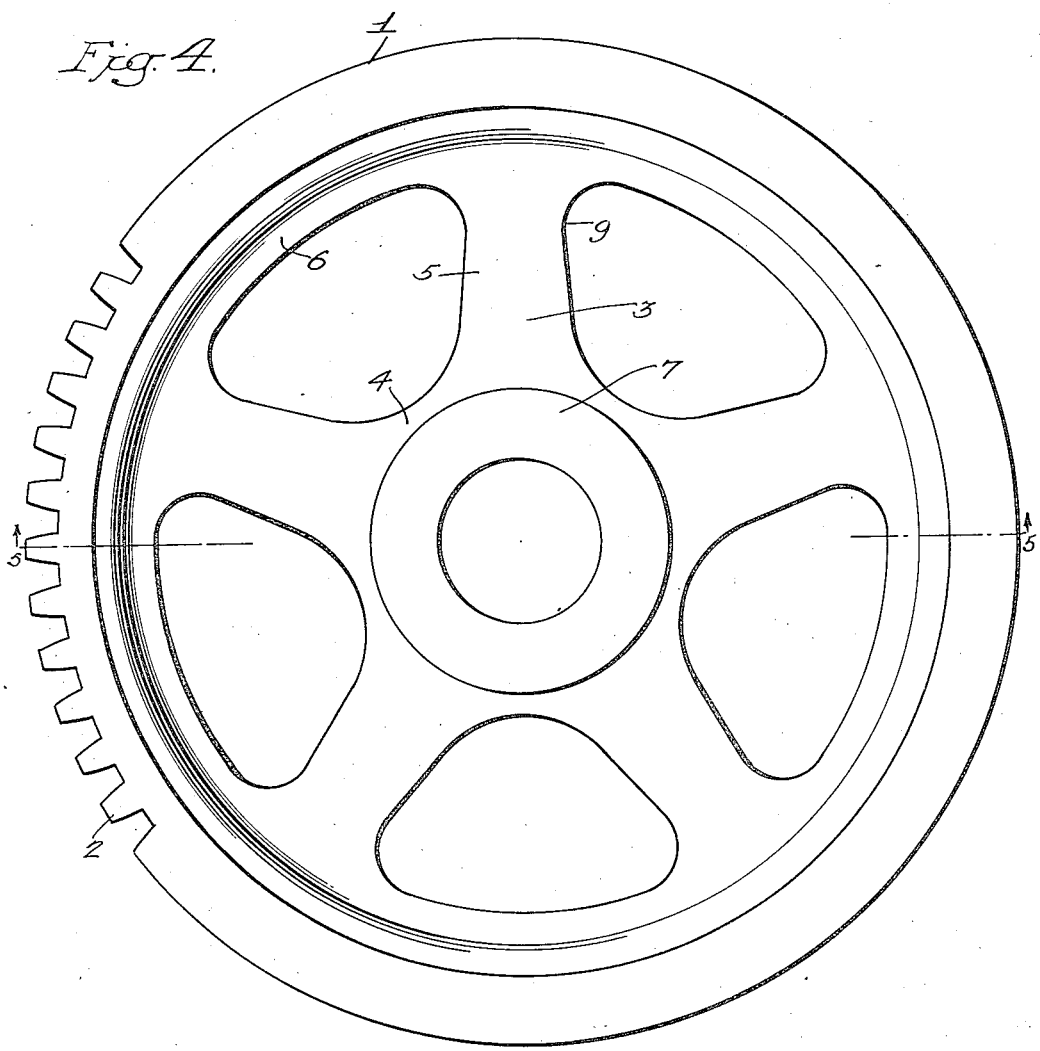
Figure 4 is a plan view of the finished gear.
Figure 5:
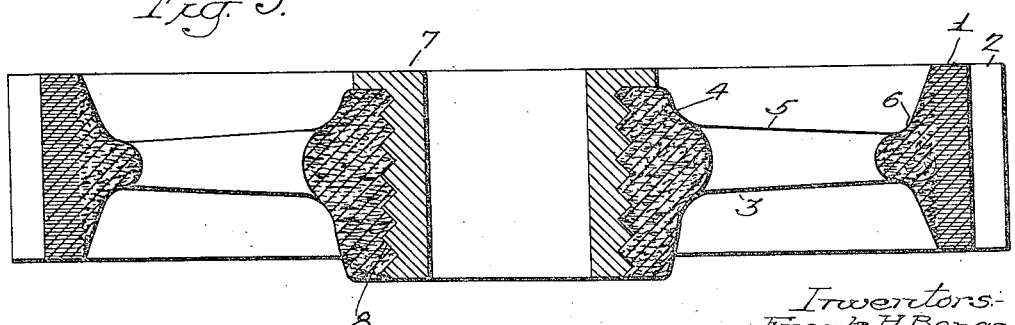
Figure 5 is a sectional view along line 5—5 of Figure 4.

Referring to the several figures of the drawing, there is shown a gear made in accordance with our invention and which comprises a rim 1 having teeth 2 (see Figure 4) integral or cut therefrom and which also comprises a spoke wheel portion 3 having a central hub 4, spokes 5, and a rim or annulus 6. It will be obvious that while we have shown a certain number of web spokes of a particular size and shape, our invention is not limited to any particular number or size and shape of such spokes. These details may be determined either by experimentation or calculation to provide a structure having the desired amount of noise reduction and sufficient mechanical strength. The hub 4 may surround and firmly bind itself to a metal bushing 7 having a series of serrations 8 on its outer surface to provide the necessary firm bond with the hub. This bushing may be provided with a keyway for fixedly mounting the device on a shaft as is well known. The two essential parts of the gear, viz. the spoke wheel portion and the rim are preferably preformed in a manner specifically described hereinafter and are then bonded together to form a unitary structure. In the present instance, the spokes 5 have their smallest or minimum dimension at a point 9 adjacent the rim or annulus 6. The dimensions of the spokes increase rapidly to the rim or annulus in one direction and less rapidly to the hub in the opposite direction.

Figure 1:
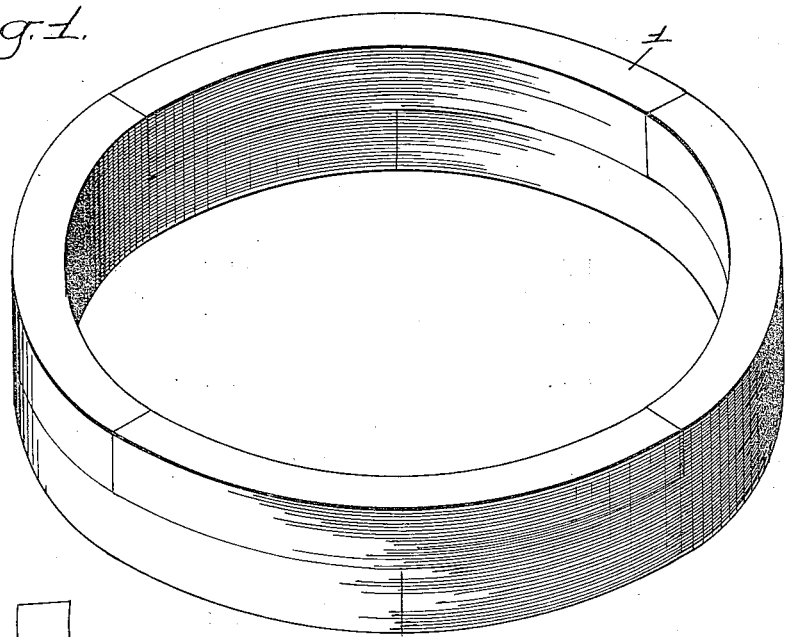
Figure 1 is a perspective view illustrating the preformed rim portion of our improved gear.
Figure 2:
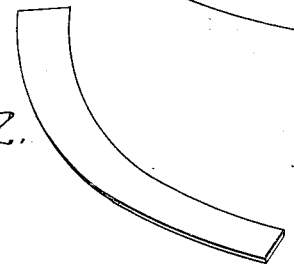
Figure 2 is one of the lamination segments used to build up the rim portion.
Figure 3:
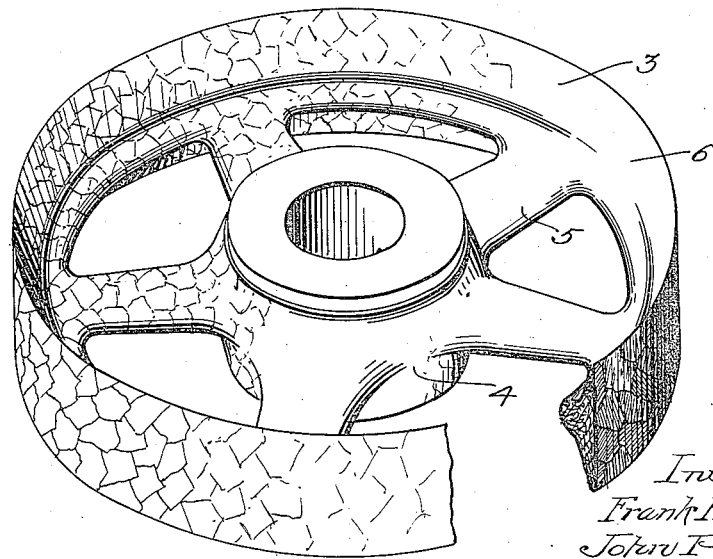
Figure 3 is a perspective view of the preformed spoke wheel portion of the gear, a part of the rim being broken away for clarity of illustration.

Referring now particularly to Figs. 1 to 3, illustrating the preferable formation of the gear, the rim 1 is preferably composed or built up of binder-impregnated laminations, preferably laminated segments placed in staggered relation as illustrated, one of these segments being shown in Figure 2. The spoke wheel portion is also preformed, but is preferably made of small pieces of binder-impregnated fibrous material, preferably scrap pieces resulting from the manufacture of the rim of the gear or other parts. This preformed portion is molded in the form of a wheel with a hub, spokes, and a rim or annulus as clearly illustrated in Figure 3. It is to be noted that the annulus, formed of massed pieces of material, has a substantial cross-sectional area, and the outer face of the annulus is of a width substantially greater than the width of the spokes and comparable to the width of the laminated rim 1. This structure assures the desired strength and firm bondage of the parts. If a metal bushing is to be incorporated in the structure, it may be associated with the spoke wheel portion during the preforming thereof.

The two portions having been preformed, as above described, are placed together in proper relation to each other, the spoke wheel portion fitting snugly within the rim portion, it being understood that the dimensions of the parts are such as to give this fit. The assembled portions are placed together in a suitable mold and subjected to heat and pressure to cause the binder to flow and firmly bond the rim 1 and the rim or annulus 6 of the wheel portion together to form a unitary article. By virtue of the provision of the rim or annulus 6 on the wheel portion and the large contact area between this annulus and rim 1, a firm bonding of the parts is obtained and great strength is imparted to the spokes.

In a typical instance of the manufacture of the gear of the present invention, the small pieces of fibrous sheet material of irregular shape, impregnated with a phenol-formaldehyde resin in its initial state in which it is fusible, usually resulting from the scrap obtained in cutting the segments for the laminated rim, is placed in a preforming mold so constructed as to produce the hub, spokes, and rim or annulus of the wheel portion. The resin-impregnated fibrous pieces may vary widely in size, generally varying from one-eighth inch at the smallest width up to one inch at the greatest width. The resin associated with the fibrous pieces varies from 40% to 60%, the latter figure being preferable, and at times, powdered resin may be added if it is desired or necessary. The material placed in the preforming mold is treated under heat and pressure for a short time to consolidate the resin-impregnated pieces into the preform which may be handled without disintegration. The laminated rim 1 may be made by assembling the phenolic resin-impregnated segments in staggered relation to build up the rim to the desired thickness and thereafter subjecting the assembled rim to a heat and pressure treatment sufficient to consolidate the segments into a preform. The preformed rim normally contains about 40% of resin. In the manufacture of the two preforms, the factors are so chosen as to obtain a good bond between the resin-impregnated fabric pieces or segments without rendering the resin infusible.

After the two preformed portions have been made, they are assembled and placed together in a curing mold and cured at a temperature between 370° F. and 400° F. at a pressure of about thirty-five hundred pounds per square inch. The time of heating depends upon the size of the gear and may be in the neighborhood of thirty minutes or more. The curing is carried out at a temperature and for a time sufficient to convert the resin into the final stage in which it is infusible and insoluble. The teeth may now be cut on the outer surface of rim 1 in any suitable manner known to the art. These teeth may be readily cut by any such methods because the product has the necessary machining qualities and strength.

Although it is preferable to preform the spoke wheel portion as above described, it is to be understood that the invention is not limited to this exact method but that this portion may be preformed in any other suitable manner. It is also to be understood that the formation of the rim portion may be varied in any suitable manner, as previously discussed.

Since the design of the improved gear of our invention has been worked out to obtain the desired reduction in noise which would otherwise be generated or reproduced by the solid web structure of the prior art, it will be apparent that the finished product resulting from any of the above-described methods or any combination thereof, is one which has highly desirable operating characteristics, and at the same time maintains the necessary mechanical strength and machining qualities. As stated above, we have found that decrease in volume of the sound generated by fiber or fabric gears of from 35% to 50% may be readily obtained, depending upon the particular shape and thickness of the spokes. Since the resonant or natural vibration frequency of the web structure has been changed by the breaking up thereof, the noises created by the operation of the gear and transmitted to the web construction will not be amplified thereby. In fact, the spokes of the web construction contemplated by our invention will have little tendency to vibrate, and even though they do vibrate, their natural frequency will be different from that of a solid web and outside the range of vibrations caused by the particular commercial speed.

We claim:

1. A fiber spoke gear comprising a rim portion composed of fibrous laminations and a binder; and a rigid spoke wheel portion composed substantially in its entirety of interspersed sizeable pieces of fibrous material and a binder, said wheel portion including a hub, circumferentially-spaced spokes, and an annulus bonded at its face to said rim portion, said annulus having a width substantially greater than its radial thickness and sufficient to effect firm bondage between the wheel portion and the rim portion, the spaces between the spokes extending substantially from the hub to the inner periphery of the annulus, and said wheel portion having substantially the same unit density and rigidity as said rim portion and thus being adapted to transmit the load.

2. A fiber spoke gear comprising a rim portion composed of fibrous laminations impregnated with synthetic resin; and a rigid spoke wheel portion composed substantially in its entirety of interspersed small sizeable pieces of fibrous material impregnated with synthetic resin, said wheel portion including a hub, circumferentially-spaced spokes, and an annulus bonded at its face to said rim portion, said annulus having a width substantially greater than its radial thickness and sufficient to effect firm bondage between the wheel portion and the rim portion, the spaces between the spokes extending substantially from the hub to the inner periphery of the annulus, and said wheel portion having substantially the same unit density and rigidity as said rim portion and thus being adapted to transmit the load.

3. A fiber spoke gear comprising a rim portion composed of fibrous laminations and a binder, and a rigid spoke wheel portion composed substantially in its entirety of interspersed sizeable pieces of fibrous material and a binder, said wheel portion including a hub, circumferentially-spaced spokes, and an annulus of a width at its outer face substantially greater than its radial thickness and substantially equal to the width of said rim portion, the spaces between the spokes extending substantially from the hub to the inner periphery of the annulus, said annulus being bonded at its outer periphery to the inner periphery of the rim portion, and said wheel portion having substantially the same unit density and rigidity as said rim portion and thus being adapted to transmit the load.

4. A fiber spoke gear comprising a preformed rim portion composed of fibrous laminations impregnated with phenolic resin in its infusible stage, and a rigid preformed spoke wheel portion composed substantially in its entirety of interspersed small sizeable pieces of fibrous material impregnated with phenolic resin in its infusible stage, said wheel portion including a hub, circumferentially-spaced spokes, and an annulus of a width at its outer face substantially greater than its radial thickness and substantially equal to the width of said rim portion, said annulus being bonded at its said face to said rim portion, the spaces between the spokes extending substantially from the hub to the inner periphery of the annulus, and said wheel portion having substantially the same unit density and rigidity as said rim portion and thus being adapted to transmit the load.

FRANK H. BENGE.
JOHN PETHO.